(12) United States Patent
Uthaman et al.

(10) Patent No.: US 12,050,534 B1
(45) Date of Patent: Jul. 30, 2024

(54) MULTI-TENANT CACHING SERVICE IN A HOSTED COMPUTING ENVIRONMENT

(71) Applicant: Amazon Technologies, Inc., Seattle, WA (US)

(72) Inventors: Karthik Uthaman, Seattle, WA (US); Ronil Sudhir Mokashi, Mercer Island, WA (US)

(73) Assignee: Amazon Technologies, Inc., Seattle, WA (US)

( * ) Notice: Subject to any disclaimer, the term of this patent is extended or adjusted under 35 U.S.C. 154(b) by 10 days.

(21) Appl. No.: 17/657,557

(22) Filed: Mar. 31, 2022

(51) Int. Cl.
  *G06F 12/0806* (2016.01)

(52) U.S. Cl.
  CPC ...... *G06F 12/0806* (2013.01); *G06F 2212/62* (2013.01)

(58) Field of Classification Search
  CPC ............. G06F 12/0806; G06F 2212/62; G06F 2212/604; G06F 2212/154
  See application file for complete search history.

(56) References Cited

U.S. PATENT DOCUMENTS

| | | | | |
|---|---|---|---|---|
| 2019/0179755 A1* | 6/2019 | Mudumbai | ........... | G06F 12/128 |
| 2020/0081867 A1* | 3/2020 | Muniswamy Reddy | ................... | G06F 3/061 |
| 2020/0092392 A1* | 3/2020 | Seelam | ................... | G06N 3/08 |
| 2022/0019366 A1* | 1/2022 | Freilich | ............... | G06F 21/6218 |
| 2022/0342718 A1* | 10/2022 | Iqbal | ....................... | H04L 67/63 |
| 2023/0171241 A1* | 6/2023 | Amichay | ............ | H04L 63/0876 726/4 |

* cited by examiner

*Primary Examiner* — Hashem Farrokh
(74) *Attorney, Agent, or Firm* — Knobbe, Martens, Olson & Bear, LLP

(57) ABSTRACT

Systems and methods are described for implementing a multi-tenant caching service. The multi-tenant caching service provides a scalable infrastructure with dedicated per-tenant cache widths for tenants of a hosted computing environment, and allows tenants to implement a caching layer between cloud-based services that would otherwise need to scale up in response to load. Tenants may also use the service as a public facing endpoint that caches content provided by backend servers. Content provided by the tenants may be distributed and cached across a cell-based architecture, each cell of which may include a set of storage volumes that are partitioned into caches for individual tenants and configured to store a portion of the content provided by that tenant. Eviction policies may be implemented based on tenant cache usage across multiple cells, and geolocation policies may be implemented to ensure that cached content remains within a particular geographic region.

22 Claims, 7 Drawing Sheets

MULTI-TENANT CACHING SERVICE IN A HOSTED COMPUTING ENVIRONMENT

BACKGROUND

Computing devices can utilize communication networks to exchange data. Companies and organizations operate computer networks that interconnect a number of computing devices to support operations or provide services to third parties. The computing systems can be located in a single geographic location or located in multiple, distinct geographic locations (e.g., interconnected via private or public communication networks). Specifically, hosted computing environments or data processing centers, generally referred to herein as "data centers," may include a number of interconnected computing systems to provide computing resources to users of the data center. The data centers may be private data centers operated on behalf of an organization, or public data centers operated on behalf of, or for the benefit of, the general public.

To facilitate increased utilization of data center resources, virtualization technologies allow a single physical computing device to host one or more instances of virtual machines that appear and operate as independent computing devices to users of a data center. With virtualization, the single physical computing device can create, maintain, delete, or otherwise manage virtual machines in a dynamic manner. In turn, users can request computing resources from a data center, such as single computing devices or a configuration of networked computing devices, and be provided with varying numbers of virtual machine resources. These resources may be used to implement services, which may provide content items or other resources in response to requests.

BRIEF DESCRIPTION OF THE DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION

Figure 1:
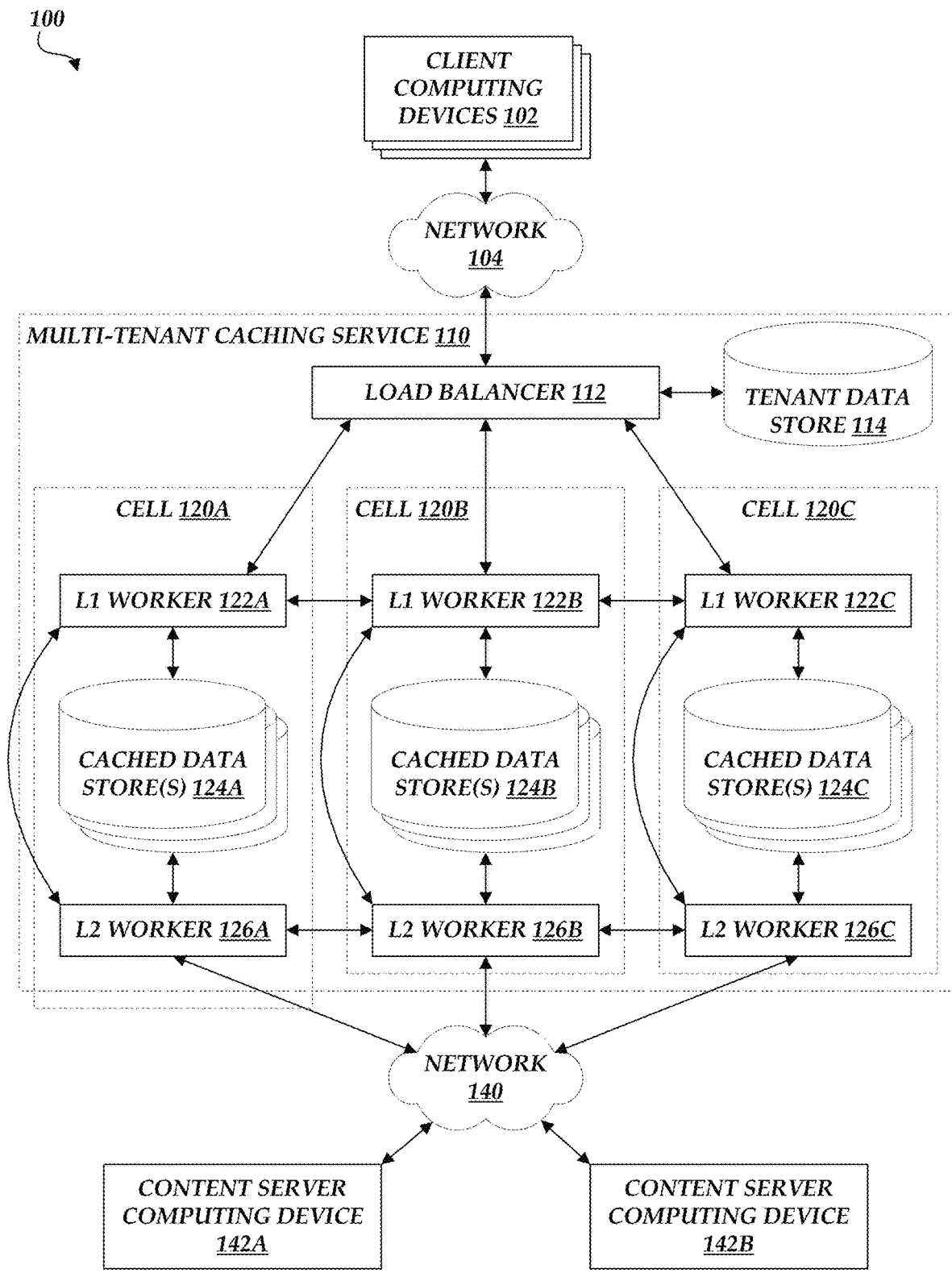
FIG. 1 is a block diagram depicting an example operating environment in which a multi-tenant caching service 110 is implemented in accordance with aspects of the present disclosure.

Generally described, aspects of the present disclosure relate to improving the efficiency of a hosted computing environment (which may be referred to herein as a "cloud computing" environment) when providing services that interact with each other or with external clients. More specifically, aspects of the present disclosure are directed to systems, methods, and computer-readable media related to implementing a multi-tenant caching service in a hosted computing environment. As described in detail herein, a hosted computing environment may provide computing resources that tenants of the environment use to implement services, which may respond to requests for content items or other resources. For example, a tenant of a hosted computing environment may use provided computing resources to implement a web server, which may respond to requests for resources by providing web pages, images, videos, or other content. As a further example, a tenant may use the resources of a hosted computing environment to implement a database, which may respond to queries and updates as needed. In some embodiments, a tenant may use the computing resources of a hosted computing environment to implement multiple services, which may interact with and request content items from each other.

A hosted computing environment may provide computing resources on an as-needed basis, and in some embodiments may manually or automatically scale the computing resources that are provided in response to variations in demand for the provided services. For example, the hosted computing environment may automatically spin up additional database servers in order to satisfy a high volume of queries, and may automatically decommission these servers when the volume of queries decreases. In some embodiments, one of the services implemented by a tenant may generate high demand for another service implemented by the tenant. In other embodiments, external demand (e.g., queries for web content) may fluctuate and may exceed the immediate supply of computing resources.

Caching may be used to reduce demand for content items that are in high demand but relatively static, such that the service implemented by the tenant does not need to generate a fresh copy of the items in response to each request. A caching service may thus request a single copy of the content item, store it locally, and then provide the stored copy in response to requests, thereby reducing load on the service implemented by the tenant. In some embodiments, tenants may implement caching services by requesting and utilizing further computing resources from the hosted computing environment. However, implementing a caching service in this manner may be difficult and time-consuming for the tenant, and may be inefficient or insecure due to limitations in how these services can be implemented by a tenant.

To address these issues, an operator of a hosted computing environment may implement a multi-tenant caching service as described herein. The multi-tenant caching service, in some embodiments, may allow tenants to create and manage secure, efficient caching services that reduce scaling of the services they have implemented in the hosted computing environment, and thereby allows tenants to use fewer resources of the hosted computing environment and frees those resources for the hosted computing environment to provide to other tenants. It will therefore be understood that the multi-tenant caching service described herein addresses a technical problem that specifically arises in the realm of computer networks, and in particular addresses a problem that arises in the realm of hosted computing environments. It will further be understood that the technical problem described herein is not analogous to any pre-Internet practice, and that the multi-tenant caching service improves the performance of a hosted computing environment by allowing tenants to make more efficient use of the computing resources of the environment.

As used herein, "content item," "content," and "item" may be used interchangeably and may refer generally to any output that may be generated or provided by a service implemented in a hosted computing environment. It will thus be understood that the present disclosure is not limited to any particular type of output and is not limited to output that is intended for consumption by an end user (e.g., audio content, video content, web pages, etc.).

Embodiments of the disclosure will now be described with reference to the accompanying figures, wherein like numerals refer to like elements throughout. The terminology used in the description presented herein is not intended to be interpreted in any limited or restrictive manner, simply because it is being utilized in conjunction with a detailed description of certain specific embodiments of the invention. Furthermore, embodiments of the invention may include several novel features, no single one of which is solely responsible for its desirable attributes or which is essential to practicing the inventions herein described.

FIG. 1 is a block diagram of an example operating environment 100 in which a multi-tenant caching service 110 is implemented in accordance with aspects of the present disclosure. In the illustrated environment 100, client computing devices 102 communicate with a load balancer 112 of the multi-tenant caching service 110 via a network 104. In general, the client computing devices 102 can be any computing device such as a desktop, laptop or tablet computer, personal computer, wearable computer, server, personal digital assistant (PDA), hybrid PDA/mobile phone, mobile phone, electronic book reader, set-top box, voice command device, camera, digital media player, and the like. The multi-tenant caching service 110 may provide the client computing devices 102 with one or more user interfaces, command-line interfaces (CLIs), application programing interfaces (APIs), and/or other programmatic interfaces for configuring and managing multi-tenant caching services. Although one or more embodiments may be described herein as using a user interface, it should be appreciated that such embodiments may, additionally or alternatively, use any CLIs, APIs, or other programmatic interfaces.

The multi-tenant caching service 110 further includes a tenant data store 114, which may communicate with the load balancer 112 (and, in some embodiments, the L1 workers 122A-C and/or L2 workers 126A-C of the cells 120A-C) and may store and provide information regarding tenants of the multi-tenant caching service 110. Such information may include, for example, the total amount of cache space that each tenant may utilize, geographic locations or regions associated with each tenant, or other data or metadata associated with tenants. In some embodiments, the tenant data store 114 may store eviction policies for individual tenants, which may include information regarding service level agreements, priorities when choosing which content items to evict, expiry rules, and so forth.

In addition to the load balancer 112 and the tenant data store 114, the multi-tenant caching service 110 may include a number of cells 120A-C, which are described in more detail below with reference to FIGS. 2A and 2B. It will be understood that three cells 120A-C are depicted in FIG. 1 for purposes of example, and that the present disclosure is not limited to any particular quantity of cells. Each cell 120A-C may include a level 1 ("L1") worker 122A-C, a level 2 ("L2") worker 126A-C, and a number of cached data stores 124A-C. In some embodiments, the number of cached data stores in a cell may be fixed (e.g., five data stores per cell, with each data store having the same capacity) to simplify maintenance and interoperability. In other embodiments, as described in more detail below, the cells 120A-C may have differing quantities of cached data stores and thus differing storage capacities. For clarity of illustration, each L1 worker 122A-C is depicted in FIG. 1 as communicating with its respective L2 worker 122A-C. However, one-to-many communication between any given L1 worker and multiple L2 workers (including both the L2 worker in the same cell and L2 workers in other cells), and between any given L2 worker and multiple L1 workers, is within the scope of the present disclosure. The cached data stores 124A-C may generally be any non-transitory computer-readable data store, such as a hard drive, solid state device, magnetic medium, database, storage service, or other device or service.

The L2 workers 126A-C of the cells 120A-C may further communicate with a number of content server computing devices 142A-B via a network 140. The networks 104 and 140 may include any wired network, wireless network, or combination thereof. For example, the networks 104 and 140 may be personal area networks, local area networks, wide area networks, over-the-air broadcast networks (e.g., for radio or television), cable networks, satellite networks, cellular telephone networks, or combinations thereof. As a further example, the networks 104 and 140 may be publicly accessible networks of linked networks, possibly operated by various distinct parties, such as the Internet. In some embodiments, the networks 104 and 140 may be private or semi-private networks, such as corporate or university intranets. The networks 104 and 140 may include one or more wireless networks, such as a Global System for Mobile Communications (GSM) network, a Code Division Multiple Access (CDMA) network, a Long Term Evolution (LTE) network, or any other type of wireless network. The networks 104 and 140 can use protocols and components for communicating via the Internet or any of the other aforementioned types of networks. For example, the protocols used by the networks 104 and 140 may include Hypertext Transfer Protocol (HTTP), HTTP Secure (HTTPS), Message Queue Telemetry Transport (MQTT), Constrained Application Protocol (CoAP), and the like. Protocols and components for communicating via the Internet or any of the other aforementioned types of communication networks are well known to those skilled in the art and, thus, are not described in more detail herein. In some embodiments, the networks 104 and 140 may include or implement a virtual private cloud ("VPC"), which enables secure communication between a client computing device 102, the multi-tenant caching service 110, and a content server computing device or devices. In other embodiments, the network 104 may be a public network and the network 140 may be a private network, such that the multi-tenant caching service 110 serves as an endpoint for public access to content items on the network 140.

It will be understood that FIG. 1 is provided for purposes of example, and that many variations on the depicted environment 100 are within the scope of the present disclosure. For example, the environment 100 may include more (or fewer) components than those depicted in FIG. 1. It is not necessary, however, to describe these other components in order to provide an enabling disclosure.

Figure 2A:
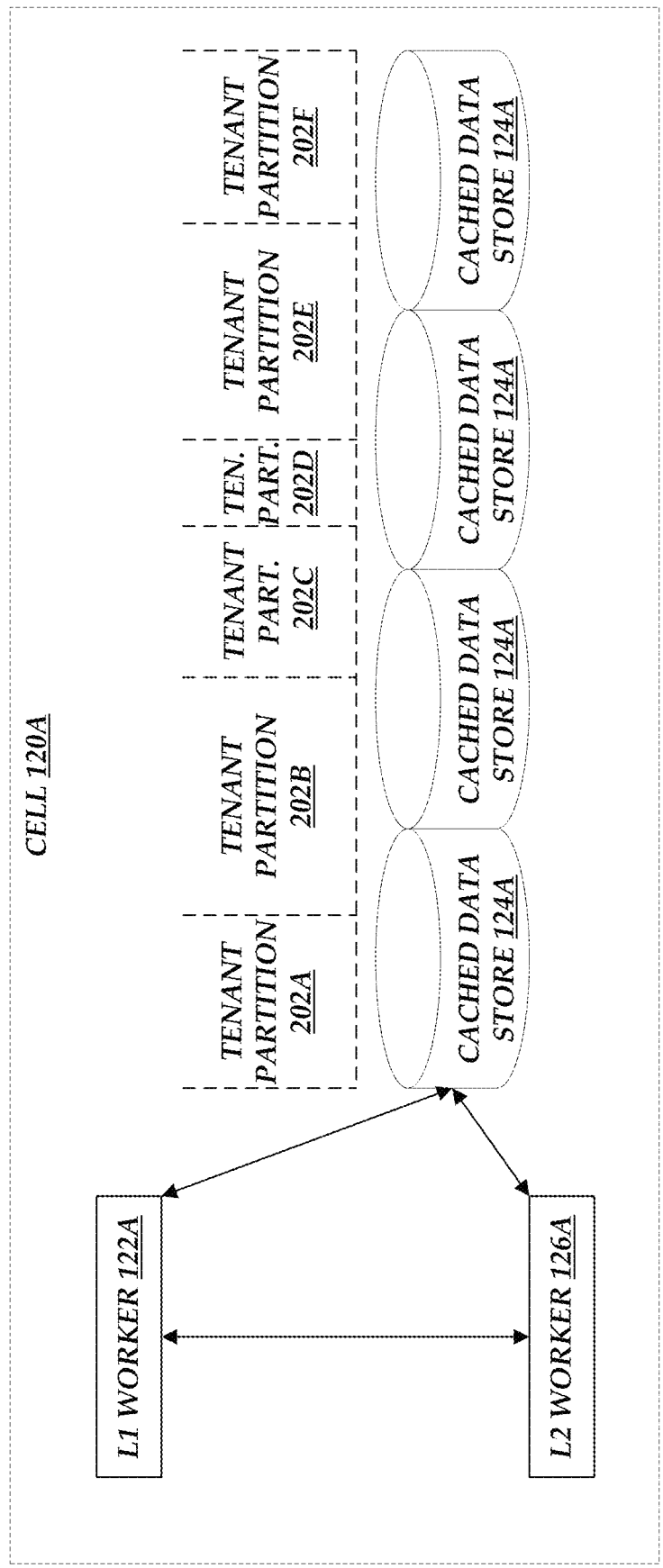
FIGS. 2A and 2B are block diagrams of cells of a multi-tenant caching service that are implemented in accordance with aspects of the present disclosure.

FIG. 2A is a block diagram of a cell 120A of a multi-tenant caching service that is implemented in accordance with aspects of the present disclosure. As depicted, the cell 120A includes the L1 worker 122A, L2 worker 126A, and a number of cached data stores 124A, which have been physically or logically divided into tenant partitions 202A-F. The partitions 202A-F may thus represent fixed amounts of storage space that have been allocated to individual tenants. Illustratively, the tenant partitions 202A-F may vary from one cell to the next. For example, the cells 120B and 120C depicted in FIG. 1 may include all, some, or none of the tenant partitions 202A-F, and may or may not include other tenant partitions beyond those depicted in FIG. 2A. Each cell of the multi-tenant caching service may thus provide caching services to a different set of tenants. In some embodiments, a cell may provide caching services to a single tenant and may not be divided into tenant partitions. For example, an entire cell or multiple cells may be provided to a tenant who requires a relatively large cache width. In further embodiments, individual cells may be sized according to tenant requirements, which may reduce or remove the need to partition data stores within each cell.

In some embodiments, each of the tenant partitions 202A-F may correspond to a different tenant of the multi-tenant caching service 110. For example, the tenant partition 202A may correspond to the tenant that operates content server computing device 142A, and the tenant partition 202C may correspond to the tenant that operates content server computing device 142B. The cell 120A may thus cache content from a number of different tenants, and the partitions 202A-F may facilitate keeping cached content from different tenants separate from each other. The tenant partitions 202A-F may further facilitate implementing separate eviction policies for each tenant, and these eviction policies may vary based on tenant requirements, service level agreements, cache widths, and so forth.

As depicted in FIG. 2A, the L1 worker 122A and L2 worker 126A may both communicate with the cached data stores 124A. (It will be understood that the L1 worker 122A and L2 worker 126A may communicate with any or all of the cached data stores 124A depicted in FIG. 2A, and that the arrows in the diagram should not be interpreted as communication with the leftmost cached data store 124A in cell 120A only). In some embodiments, the L1 worker 122A may utilize a different set of partitions than the L2 worker. For example, tenant partition 202D may store a relatively small cache of "hot items" that are frequently requested or must meet a latency target, and the L1 worker 122A may maintain this cache in order to provide low-latency responses to requests for these popular items. The L2 worker 126A may then maintain a larger cache (stored in, e.g., partition 202E) of content items provided by the tenant. In some embodiments, the L1 worker 122A may "promote" an item from a cache that the L2 worker 126A maintains to a cache that the L1 worker 122A maintains, or may "demote" an item from the L1 cache to the L2 cache. In other embodiments, as discussed below, the L1 worker 122A may forward a request for a content item to the L2 worker, which may retrieve it from a partition it maintains on the cached data stores 124A or retrieve it from the tenant.

In some embodiments, the multi-tenant caching service 110 may implement a policy of caching content for a particular tenant only on cells that are hosted in a particular geographic region. For example, the tenant (or the content items provided by the tenant) may be subject to data privacy laws that prohibit the export of data outside a particular geographic region. The multi-tenant caching service 110 may thus implement a policy on only using cells that are physically hosted in the geographic region to cache content items for that particular tenant. In other embodiments, the multi-tenant caching service 110 may limit caching to cells that are in the geographic region of the client computing device 102 requesting the content.

Figure 2B:
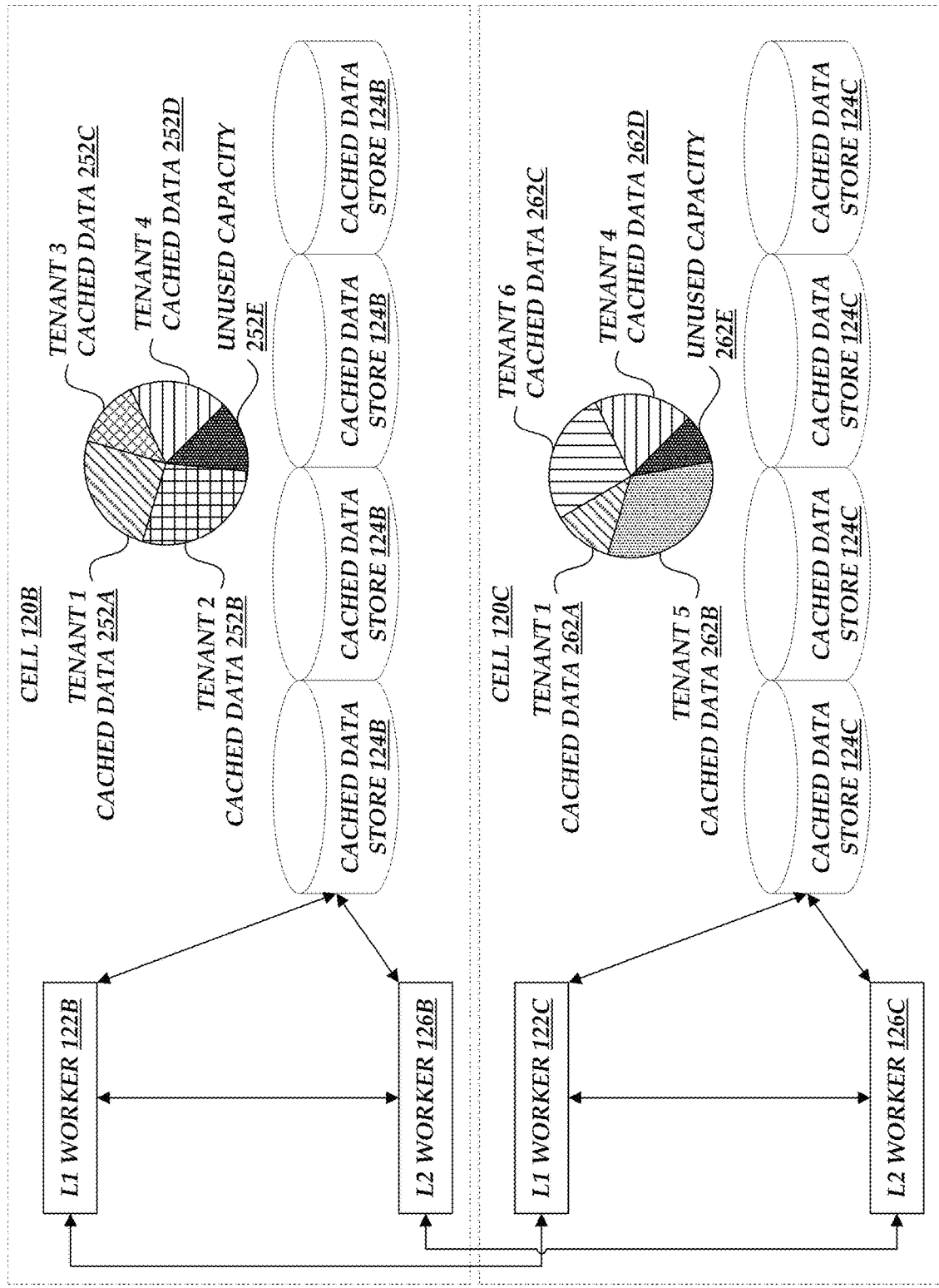

FIG. 2B is a block diagram of multiple cells 120B and 120C of a multi-tenant caching service that are implemented in accordance with aspects of the present disclosure. As depicted, the cells 120B and 120C include components similar to those depicted in FIG. 2A. However, instead of being divided into fixed tenant partitions 202A-F, the cached data stores 124B and 124C of FIG. 2B cache content items for respective sets of tenants on an as-needed basis, and communicate with each other to ensure that individual tenants do not consume more than their allotted amount of cache space across all of the cells that cache data for the tenant. For example, the cached data stores 124B of the cell 120B may store tenant 1 cached data 252A, tenant 2 cached data 252B, tenant 3 cached data 252C, and tenant 4 cached data 252D, and may optionally have unused capacity 252E. Similarly, the cached data stores 124C of the cell 120C may store tenant 1 cached data 262A, tenant 5 cached data 262B, tenant 6 cached data 262C, tenant 4 cached data 262D, and may optionally have unused capacity 262E.

In some embodiments, the content items cached for a particular tenant may differ from one cell to another. For example, the cached data 252A stored for tenant 1 in the cached data stores 124B of the cell 120B may differ from the cached data 262A stored for the same tenant in the cached data stores 124C of the cell 120C. In other embodiments, the cells 120B and 120C may redundantly cache content items for a particular tenant. For example, the tenant 4 cached data 252D may be partially or completely the same as the tenant 4 cached data 262D. In some embodiments, both cells 120A and 120B may be configured to store a particular set of data for tenant 2, but different requests for content items may be distributed to the cells 120A and 120B such that the actual content items cached by the cells 120A and 120B differ.

In some embodiments, the multi-tenant caching service 110 may implement eviction policies that account for tenant cache usage across multiple cells. For example, the multi-tenant caching service may implement an eviction policy that evicts a percentage of tenant 1's content items from each of the cells 120B and 120C when the tenant's total cache space utilization across all cells exceeds their allocated cache size, which may be obtained from, e.g., the tenant data store 114 depicted in FIG. 1. The service may thus apply a formula such as the one below to determine the percentage of content items to evict from each cell.

$$\text{Eviction}_{Percentage} = \frac{(CacheUsage_{Total} - CacheUsage_{Max})}{CacheUsage_{Total}}$$

The multi-tenant caching service may thus utilize the cached data stores 124B and 124C more efficiently than could be achieved by implementing a collection of dedicated single-tenant caching services.

Figure 3A:
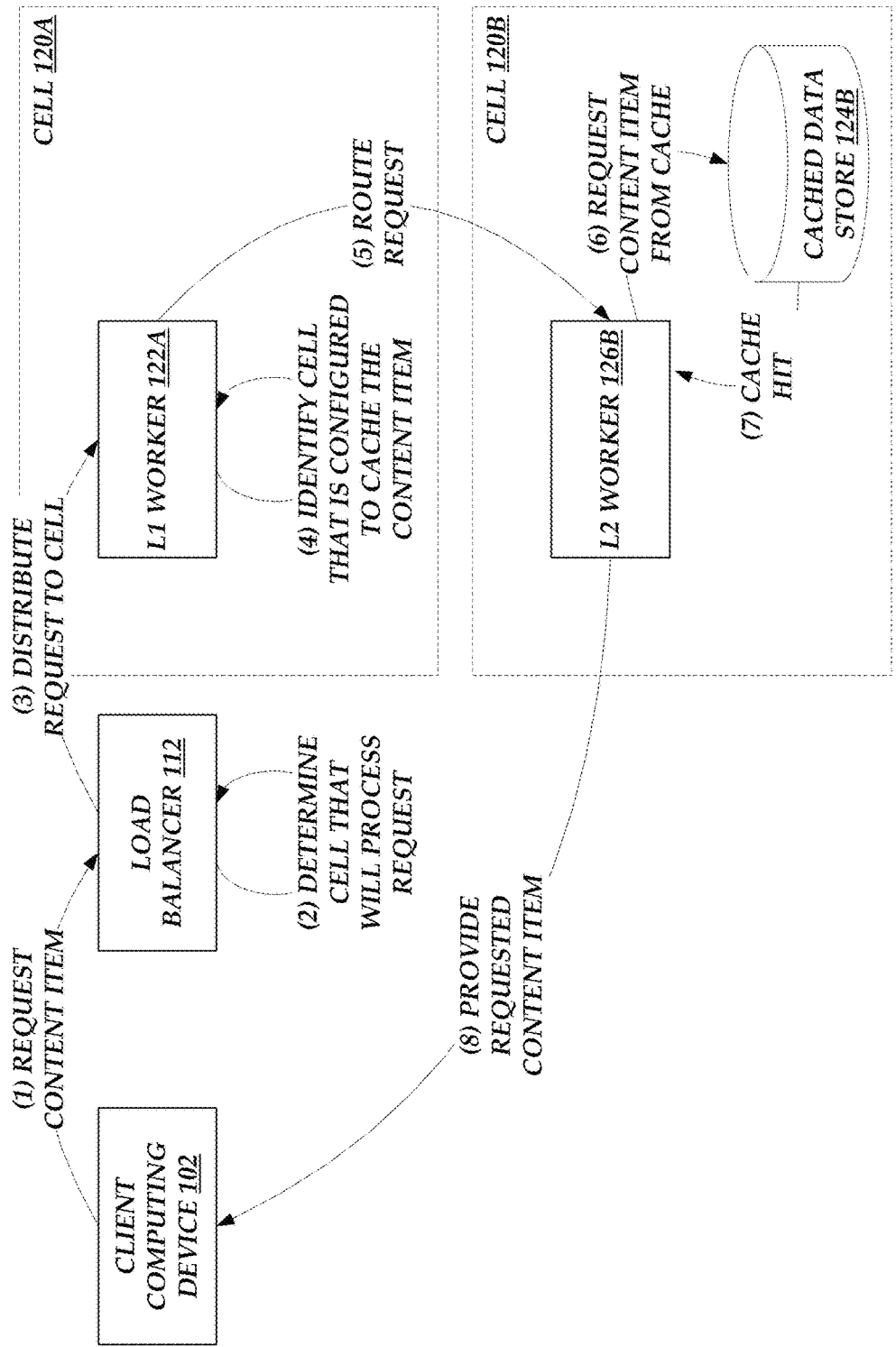
FIGS. 3A and 3B are flow diagrams depicting example interactions for implementing a multi-tenant caching service in accordance with aspects of the present disclosure.
Figure 3B:
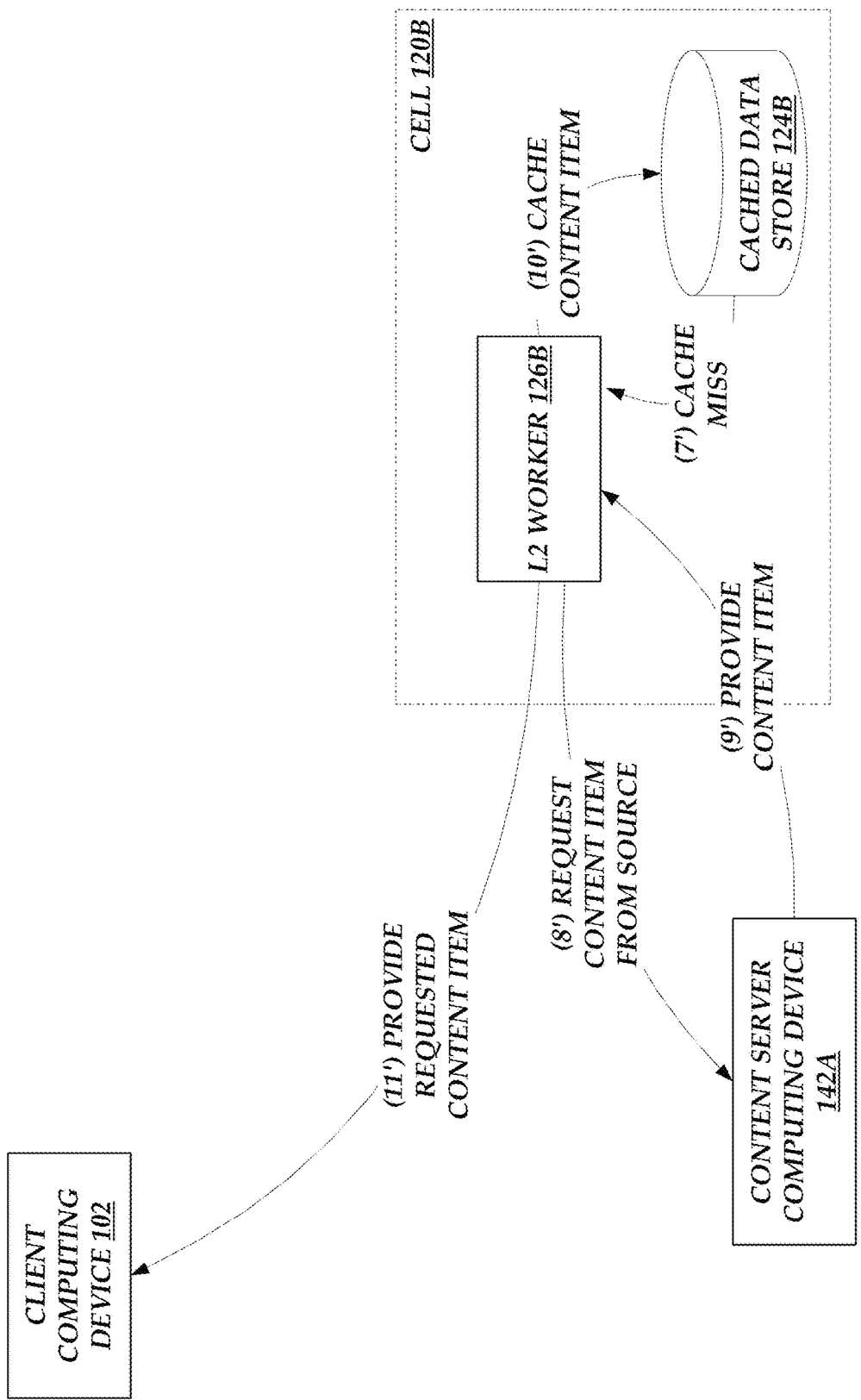

FIGS. 3A and 3B are flow diagrams depicting example interactions for implementing a multi-tenant caching service in accordance with aspects of the present disclosure. As discussed above, the example interactions may allow a hosted computing environment to provide caching services more efficiently, both in terms of higher cache hit rates and lower utilization of computing resources. With reference now to FIG. 3A, at (1), a client computing device 102 may request a content item by transmitting the request to a load balancer 112 of a multi-tenant caching system.

At (2), the load balancer 112 may determine which cell of the multi-tenant caching system will process the request for the content item. In some embodiments, the load balancer 112 may select a cell based on the cell server load, which may be determined, for example, based on the quantity of requests the load balancer 112 has distributed to each of the cells. In other embodiments, the load balancer 112 may identify a cell based on a combination of server load and cell configuration information. For example, the load balancer 112 may identify three cells that are configured to cache a set of items that includes the requested content item, and may select the cell out of these three that has the lightest load.

At (3), the load balancer distributes the request to the L1 worker 122A of the cell 120A that was determined at (2). The L1 worker 122A then, at (4), identifies a cell that is configured to cache, and thus may currently have in its cache, the requested content item. The L1 worker 122A may identify such a cell by carrying out a routine, such as the routine 400 described in more detail below. Illustratively, the L1 worker 122A may identify a cell that is configured to cache a set of items that includes the requested content item. In some embodiments, the load balancer 112 may instead identify a cell that is configured to cache the requested content item, and may distribute the request to that cell, in which case the interaction at (4) may be omitted. Additionally, in some embodiments, the L1 worker 122A may determine whether a copy of the requested content item is stored in a low-latency "hot item" cache that the L1 worker 122A maintains, which may illustratively be a smaller or faster cache (and may be stored in a different partition) than the cache implemented by the L2 worker 126A of the cell 120A. If so, then the interactions at (5), (6), (7), and (8) are omitted, and the L1 worker 122A instead retrieves the requested item from the "hot item" cache and provides it (directly or indirectly) to the client computing device 102.

At (5), the L1 worker 122A routes the request for the content item to the L2 worker 126B of a cell 120B that is configured to cache the content item. In some embodiments (not depicted in FIG. 3A), the L1 worker 122A may determine that its own cell 120A is configured to cache a set of items that includes the content item, and thus may route the request internally within the cell 120A (e.g., to the L2 worker 126A depicted in FIG. 1) instead of routing the request to another cell 120B.

At (6), the L2 worker 126B requests the content item from one of the cached data stores 124B of the cell 120B. In some embodiments, as described above with reference to FIG. 2A, the cached data stores 124B of the cell 120B may be physically or logically divided into partitions, which may be assigned to various tenants of the multi-tenant caching service. The L2 worker may thus request the content item from the partition assigned to the associated tenant. In other embodiments, as described above with reference to FIG. 2B, the tenants may be allocated a fixed amount of cache (e.g., 100 terabytes), and the storage associated with that cache may be allocated on an as-utilized basis from the cached data stores 124B of multiple cells 120A-C of the multi-tenant caching service 110.

In some embodiments, the requested content item has previously been cached in the cached data store 124B (a "cache hit"). In such embodiments, at (7), the cached data store 124B provides the requested content item. At (8), the L2 worker 126B then provides the requested content item to the client computing device 102. In some embodiments, the L2 worker 126B transmits the content item to the load balancer 112 or another device that was in communication with the client computing device at (1), and the load balancer 112 or other device transmits the requested content item to the client computing device.

With reference now to FIG. 3B, embodiments in which the requested content item had not previously been cached in the cached data store 124B (a "cache miss") will be described. At (7'), the cached data store 124B reports to the L2 worker 126B that the cache does not contain a copy of the requested content item. Accordingly, at (8'), the L2 worker 126B requests a copy of the content item from the source, which as depicted is a content server computing device 142A operated by the tenant that provides the content item. At (9'), the content server computing device 142A provides the requested content item to the L2 worker 126B.

At (10'), in some embodiments, the L2 worker 126B caches the requested content item in the cached data store 124B. Illustratively, the L2 worker 126B may determine whether to cache the requested content item based on a number of factors, such as available space in the tenant's cache partition, frequency of requests for the content item, the popularity of items that are currently cached, eviction policies, or other factors. At (11'), the L2 worker 126B directly or indirectly provides the requested content item to the client computing device 102, as discussed above.

It will be understood that FIGS. 3A and 3B are provided for purposes of example, and that many variations on the depicted interactions are within the scope of the present disclosure. For example, the interaction at (10') may be carried out after or in parallel with the interaction at (11'). As a further example, the multi-tenant caching service may be implemented with a single worker in each cell rather than L1 and L2 workers in each cell, and the load balancer 112 may perform some or all of the functions attributed to the L1 workers, such as L1 worker 122A. FIGS. 3A and 3B are thus understood to be illustrative and not limiting.

Figure 4:
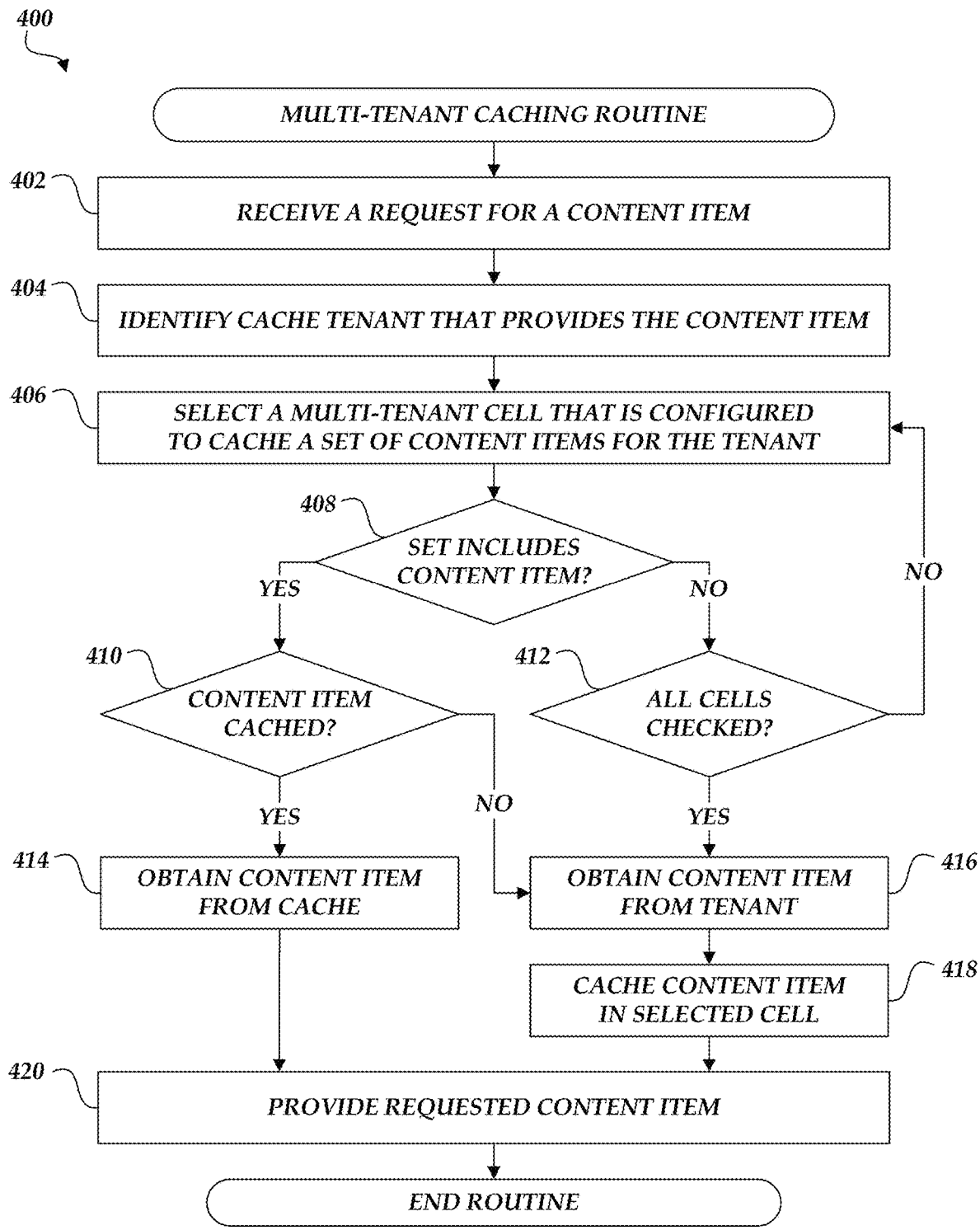
FIG. 4 is a flowchart depicting an example routine for implementing multi-tenant caching in accordance with aspects of the present disclosure.

FIG. 4 is a flowchart depicting an example routine 400 for implementing multi-tenant caching in accordance with aspects of the present disclosure. The routine 400 may be carried out, for example, by the multi-tenant caching service 110 depicted in FIG. 1. The routine 400 begins at block 402, where a request may be received for a content item. The request may illustratively be received from a computing device, such as one of the client computing devices 102 depicted in FIG. 1. In some embodiments, the request may include a uniform resource locator ("URL") that locates the content item.

At block 404, a tenant of the multi-tenant caching service may be identified as the tenant that provides the content item. In some embodiments, the tenant may be identified from a URL used to request the content item. In other embodiments, the tenant may be identified based on metadata associated with the request or other attributes of the request.

At block 406, a multi-tenant cell that is configured to cache a set of content items for the tenant may be identified. Illustratively, as described in more detail above, individual cells of the multi-tenant caching service may be configured to cache content items for multiple tenants, and may be configured to cache a particular set of content items for a given tenant. For example, a cell of the multi-tenant caching service may be configured to cache content items associated with a particular set of URLs (e.g., URLs containing the string "example.com/news/"). As a further example, a cell may be configured to cache content items that are responsive to requests that fall within a particular range of hash values. As discussed above, it will be understood that a cell configured to cache a set of content items may contain all, some, or none of the content items in the set at various points in time, depending on factors such as the storage capacity of the cell (or, in some embodiments, the portion of the storage capacity of the cell that has been partitioned or dedicated to this particular tenant), the size of the set of content items, the requests for content items that have been received thus far or are expected to be received, the eviction policy of the cell as applied to content items for this tenant, and other factors.

At decision block 408, a determination may be made as to whether the set of items that the selected cell is configured to cache includes the requested content item—that is, whether the content item, if it were cached, would be cached in this cell. If the determination at decision block 408 is that the content item would be cached in this cell, then the routine 400 branches to decision block 410, where a determination is made as to whether the content item is indeed cached in the cell. If so, then at block 414 the content item is obtained from the cell's cache. If the determination at decision block 410 is that the content item has not been cached, then the routine 400 branches to block 416, where the content item may be obtained from its original source (e.g., a content server operated by the tenant).

If the determination at decision block 408 is that the set of content items that may be cached at this cell does not include the requested content item, then at decision block 412 a determination is made as to whether there are other cells that cache content items for this tenant. If the determination is that all cells that provide caching services for this tenant have been checked, and none of them have been configured to cache the requested content item, then the routine 400 branches to block 416, where the content item may be obtained from the tenant as described above. If, however, the determination at decision block 412 is that there are other cells that have not yet been checked, then the routine 400 returns to block 406, selects one of the cells that has not yet been checked, and iterates until a cell with the desired configuration is found or until all cells have been checked.

In some embodiments, after obtaining the content item from the tenant at block 416, the routine 400 may proceed to block 418, where the content item may then be optionally cached. In embodiments where block 418 is reached by branching from decision block 410, the content item may be cached in the cell selected at block 406 that is configured to cache a set of content items that includes the obtained content item. In further embodiments, a determination may be made as to whether to cache the obtained content item (e.g., if caching the obtained content item would require evicting another content item from the cache). Additionally, in embodiments where block 418 is reached by branching from decision block 412 (i.e., because no cell was configured to cache the content item), a determination may be made as to whether a configuration of one of the cells should be updated or reconfigured to include the obtained content item, or whether an additional cell should be configured to cache additional content items for the tenant.

At block 420, the content item obtained at block 414 or block 416 may be provided in response to the request received at block 402. In some embodiments, block 420 may be carried out prior to, in parallel with, or instead of block 418.

It will be understood that FIG. 4 is provided for purposes of example, and that many variations on the illustrated routine 400 are within the scope of the present disclosure. For example, identifying the tenant at block 404 may be deferred until after a determination is made at decision block 410 that a multi-tenant cell configured to cache the requested content item does not currently have the item in its cache. As a further example, the routine 400 may identify a cell that may cache the requested item using a lookup table or data store that stores the sets of content items that cells are configured to cache. FIG. 4 is thus understood to be illustrative and not limiting.

Figure 5:
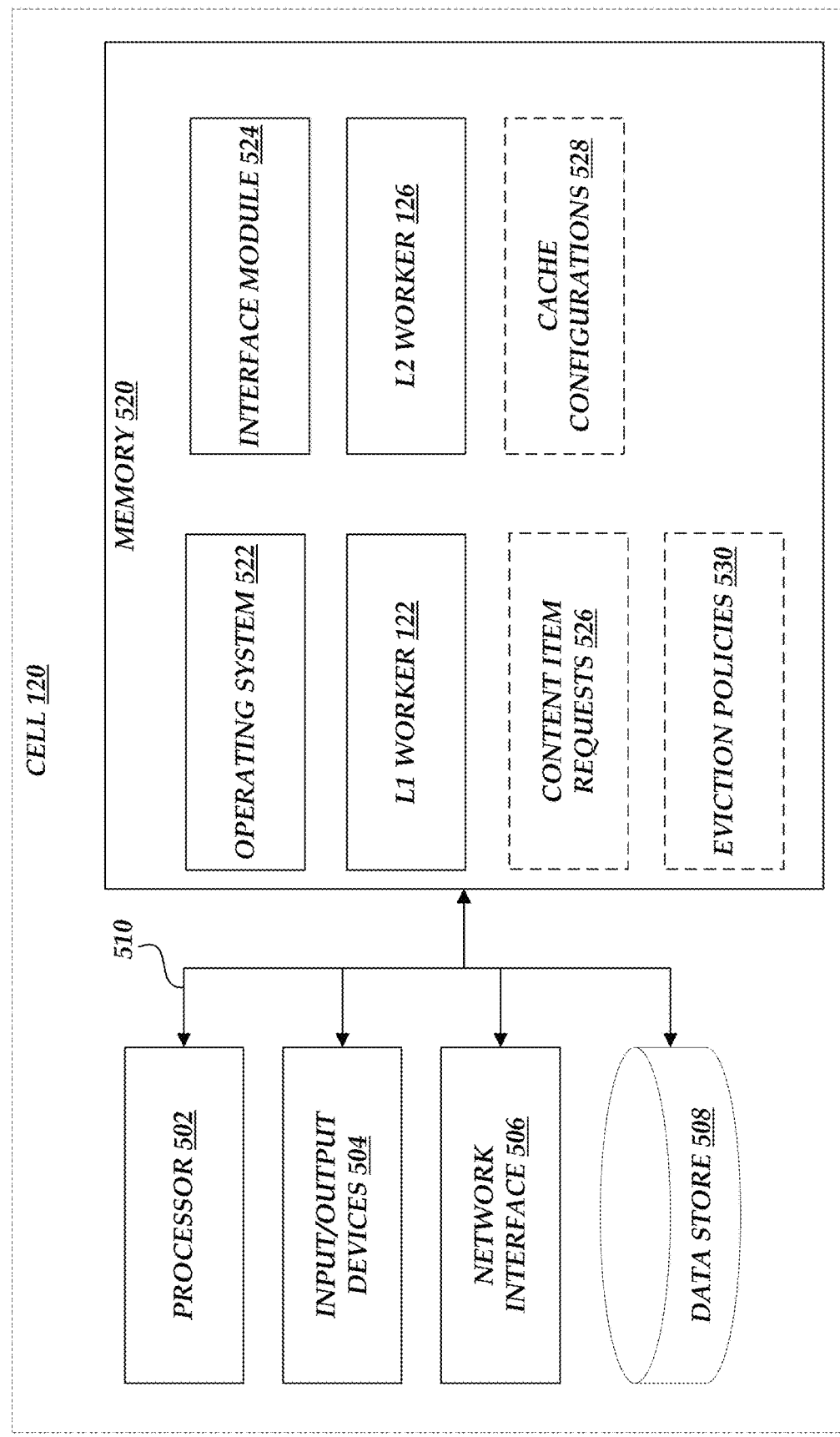
FIG. 5 depicts a general architecture of a computing system that operates to store and retrieve cached content in embodiments of the multi-tenant caching service described herein.

FIG. 5 depicts a general architecture of a computing system (referenced as cell 120) that operates to store and retrieve cached content in embodiments of the multi-tenant caching service 110 described herein. The general architecture of the cell 120 depicted in FIG. 5 includes an arrangement of computer hardware and software modules that may be used to implement aspects of the present disclosure. The hardware modules may be implemented with physical electronic devices, as discussed in greater detail below. The cell 120 may include many more (or fewer) elements than those shown in FIG. 5. It is not necessary, however, that all of these generally conventional elements be shown in order to provide an enabling disclosure. Additionally, the general architecture illustrated in FIG. 5 may be used to implement one or more of the other components illustrated in FIGS. 1 and 2. As illustrated, the ephemeral cluster manager 130 includes a processor 502, input/output device interfaces 504, a network interface 506, and a data store 508, all of which may communicate with one another by way of a communication bus 510. The network interface 506 may provide connectivity to one or more networks or computing systems, such as the load balancer 112, user devices 102, or other components of the multi-tenant caching service 110. The processor 502 may thus receive information and instructions from other computing systems or services via the network 104. The processor 502 may also communicate to and from a memory 520 and further provide output information for an optional display (not shown) via the input/output device interfaces 504. The input/output device interfaces 504 may also accept input from an optional input device (not shown).

The memory 520 may contain computer program instructions (grouped as modules in some embodiments) that the processor 502 executes in order to implement one or more aspects of the present disclosure. The memory 520 generally includes random access memory (RAM), read only memory (ROM) and/or other persistent, auxiliary or non-transitory computer readable media. The memory 520 may store an operating system 622 that provides computer program instructions for use by the processor 502 in the general administration and operation of the cell 120. The memory 520 may further include computer program instructions and other information for implementing aspects of the present disclosure. For example, in one embodiment, the memory 520 includes an interface module 524 that generates interfaces (and/or instructions therefor) for interacting with the load balancer 112 or other computing devices, e.g., via an API, CLI, and/or Web interface. In addition, the memory 520 may include and/or communicate with one or more data repositories (not shown), for example, to access user program codes and/or libraries.

In addition to and/or in combination with the interface module 524, the memory 520 may include an L1 worker 122 and an L2 worker 126 that may be executed by the processor 502. In one embodiment, the L1 worker 122 and L2 worker 126 implement various aspects of the present disclosure, e.g., identifying which cell 120 may cache a particular content item and retrieving uncached content items from tenants, as described further above. While the L1 worker 122 and L2 worker 126 are shown in FIG. 5 as part of the cell 120, in other embodiments, all or the L1 worker 122 and L2 worker 126 may be implemented by other components of the multi-tenant caching system 110 and/or another computing device. For example, in certain embodiments of the present disclosure, another computing device in communication with the cell 120 may include several modules or components that operate similarly to the modules and components illustrated as part of the cell 120.

The memory 520 may further include content item requests 526 and cache configurations 528, which may be loaded into memory in conjunction with fulfilling requests for content items and identifying where these content items may be cached. The memory 520 may still further include eviction policies 530, which may be implemented (as described in more detail above) by the L1 worker 122, the L2 worker 126, or another component of the cell 120. In some embodiments, the memory 520 may further include, e.g., hash values for requested content items and sets or ranges of hash values that are stored in particular cells 120, which may be utilized to identify the cell 120 that may cache a particular content item.

In some embodiments, the cell 120 may further include components other than those illustrated in FIG. 5. For example, the memory 520 may further include content items that have been obtained from a tenant and are in the process of being cached, cached content items that were obtained from a cached data store and are in the process of being transmitted to fulfill a request, cache eviction policies, client or cached data store geolocation data, or other information. FIG. 5 is thus understood to be illustrative but not limiting.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules, including one or more specific computer-executable instructions, that are executed by a computing system. The computing system may include one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might," or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B, and C" can include a first processor configured to carry out recitation A working in conjunction with a second processor configured to carry out recitations B and C.

What is claimed is:
1. A system comprising:
a plurality of content data store cells, each of the plurality of content data store cells comprising one or more content item data stores configured to store cached content items;
a caching service data store configured to store computer-executable instructions; and
a processor in communication with the caching service data store, wherein the computer-executable instructions, when executed by the processor, configure the processor to implement a multi-tenant caching service that performs operations including:
  receiving, from a client computing device, a request for a first content item;
  determining that the first content item is provided by a first tenant of a plurality of tenants of the multi-tenant caching service;
  identifying, from the plurality of content data store cells, a first content data store cell that is configured to cache a plurality of sets of content items provided by the first tenant of the multi-tenant caching service, the plurality of sets of content items comprising a first set of content items including the first content item, wherein each content data store cell of the plurality of content data store cells is configured to cache content items for a plurality of tenants;
  determining that the first content data store cell does not currently cache the first content item;
  obtaining the first content item from the first tenant;
  caching the first content item in a first content data store of the first content data store cell, wherein at least a portion of the first content data store is associated with the first tenant and the first set of content items; and
  transmitting the first content item to the client computing device.

2. The system of claim 1, wherein identifying the first content data store cell comprises determining that the first set of content items includes the first content item.

3. The system of claim 1, wherein the first content data store cell is configured to cache a second set of content items provided by a second tenant of the plurality of tenants of the multi-tenant caching service.

4. The system of claim 1, wherein a second content data store cell of the plurality of content data store cells is configured to cache a second set of content items provided by the first tenant.

5. The system of claim 1, wherein the first content data store cell comprises a plurality of fixed-size partitions, and wherein individual partitions of the plurality of fixed-size partitions correspond to individual tenants of the multi-tenant caching service.

6. A computer-implemented method comprising:
  receiving, from a client computing device, a request for a first content item provided by a first tenant of a plurality of tenants of a multi-tenant caching service;
  identifying, from a plurality of data store cells of the multi-tenant caching service, a first data store cell that is configured to cache a plurality of sets of content items provided by the first tenant, the plurality of sets of content items comprising a first set of content items including the first content item, wherein each data store cell of the plurality of data store cells is configured to cache content items for a plurality of tenants;
  responsive to a determination that the first data store cell has not cached the first content item:
    obtaining the first content item from the first tenant; and
    caching the first content item in the first data store cell; and
  responsive to the request for the first content item, transmitting the first content item to the client computing device.

7. The computer-implemented method of claim 6, wherein the request from the client computing device is received via a private network that includes the client computing device, and the first data store cell, and wherein the first content item is obtained from the first tenant via the private network.

8. The computer-implemented method of claim 6, wherein the request from the client computing device is received via a public network, and wherein the first content item is obtained from the first tenant via a private network.

9. The computer-implemented method of claim 6, wherein caching the first content item in the first data store cell comprises storing the first content item in a fixed-size partition associated with the first tenant.

10. The computer-implemented method of claim 6, wherein identifying the first data store cell comprises determining that the first set of content items includes the first content item.

11. The computer-implemented method of claim 6, wherein identifying the first data store cell is based on a hash value determined for the first content item.

12. The computer-implemented method of claim 6 further comprising:
  receiving cache usage data for the first tenant from one or more data store cells of the plurality of data store cells.

13. The computer-implemented method of claim 12 further comprising:
  determining, based on the cache usage data for the first tenant, to evict at least one content item from the first data store cell; and
  evicting the at least one content item from the first data store cell.

14. The computer-implemented method of claim 12 further comprising:
  determining, based on the cache usage data for the first tenant, to reconfigure the first data store cell to cache an updated set of items provided by the first tenant.

15. The computer-implemented method of claim 6, wherein the multi-tenant caching service implements a policy of caching content for the first tenant only on data store cells that are hosted in a first geographic region.

16. The computer-implemented method of claim 6, wherein a second data store cell of the plurality of data store cells is configured to cache at least a portion of the first set of content items.

17. The computer-implemented method of claim 6 further comprising:
  receiving, from the client computing device, a request for a second content item;
  determining that the second content item is provided by the first tenant;
  identifying, from the plurality of data store cells of the multi-tenant caching service, a second data store cell that is configured to cache a second set of content items provided by the first tenant, the second set of content items including the second content item.

18. A computer-implemented method comprising:
  receiving, from a client computing device, a request for a first content item;
  identifying, from a plurality of data store cells of a multi-tenant caching service, a first data store cell that is configured to cache a plurality of sets of content items provided by a first tenant, the plurality of sets of content items comprising a first set of content items including the first content item, wherein each data store cell of the plurality of data store cells is configured to cache content items for a plurality of tenants;
  obtaining the first content item from one or more of the first data store cell or the first tenant; and transmitting the first content item to the client computing device.

19. The computer-implemented method of claim 18 further comprising determining that the first content item is provided by the first tenant.

20. The computer-implemented method of claim 18, wherein obtaining the first content item from one or more of the first data store cell or the first tenant comprises obtaining the first content item from the first data store cell in response to a determination that the first data store cell has cached the first content item.

21. The computer-implemented method of claim 18 further comprising identifying the plurality of data store cells based on a geolocation of the client computing device.

22. The computer-implemented method of claim 21, wherein each of the plurality of data store cells is located in a geographic region associated with the geolocation of the client computing device.

* * * * *